United States Patent [19]

Weber et al.

[11] 4,361,632
[45] Nov. 30, 1982

[54] ALKALINE BATTERY, COMPOSITE SEPARATOR THEREFOR

[75] Inventors: Robert E. Weber, Appleton; Joseph Borovsky, Menasha, both of Wis.

[73] Assignee: Kimberly-Clark Corporation, Neenah, Wis.

[21] Appl. No.: 266,437

[22] Filed: May 22, 1981

[51] Int. Cl.³ .............................................. H01M 2/16
[52] U.S. Cl. .................................... 429/145; 429/251; 429/254
[58] Field of Search ............... 429/145, 144, 251, 252, 429/254; 427/181, 185

[56] References Cited

U.S. PATENT DOCUMENTS 3,951,687  4/1976  Takamura et al. .................... 136/28
4,037,033  7/1977  Takamura et al. ................... 429/206
4,109,066  8/1978  Dick et al. ........................... 429/145
4,154,912  5/1979  Philipp et al. .................... 429/253 X
4,218,280  8/1980  Philipp et al. .................... 429/139 X
4,220,693  9/1980  Di Palma et al. ................... 429/133

Primary Examiner—Charles F. LeFevour
Attorney, Agent, or Firm—Wendell K. Fredericks; William D. Herrick; Howard Olevsky

[57] ABSTRACT

A dual function, composite absorber/barrier battery separator for alkaline cells is comprised of a moderately cross-linked polyvinyl alcohol film and a flexible, fibrous and wettable absorber web, the film being semipermeable to electrolyte flow. The film is mechanically bonded to a top surface of the web in a manner so as to minimize the delays of transitions from hydrodynamic flow to diffusional flow through the separator during cell operation.

The invention also includes the method of making the composite separator.

14 Claims, 4 Drawing Figures

ALKALINE BATTERY, COMPOSITE SEPARATOR THEREFOR

BACKGROUND OF THE INVENTION

1. Field of the Invention

The present invention relates generally to battery separator systems and methods for preparing the same and particularly to composite absorber/polyvinyl alcohol (PVA) barrier separator systems for use, for example in cells of high energy density secondary alkaline batteries.

2. Description of the Prior Art

Fabricating techniques for fabricating battery separators for alkaline battery cells have included the technique of thermally adhering, at limited sites, a thin polymer film separator to a synthetic, fibrous, heat sealable electrolyte absorbent sheet whereby a composite thin film separator/absorbent sheet is formed and maintained throughout handling and within a finished cell. For a discussion of this technique see U.S. Pat. No. 4,220,693 issued Sept. 2, 1980 to Ralph B. DiPalma and Anthony Loh, Jr. Such a composite structure appears to provide improved handling characteristics and dimensional stability of thin film separators as well as to eliminate a step in cell manufacture whereby installation of a separate electrolyte absorbent member is eliminated. However, this thermal adhering approach for forming a dual function separator seems to be an ineffective technique since spot thermal adhering two sheets together may cause spotty densification of the separator material, resulting in regions of the separator to be impermeable to both diffusion and hydrodynamic flow of electrolyte ions.

Another technique that has been employed which eliminates the need for providing a sandwich-type system, i.e., a barrier attached to an absorber in a battery cell, is to form a composite separator by laminating; for example, a sheet of lightly crosslinked PVA film is laminated to a top surface of a sheet of absorber material. Such a technique can provide an effective battery separator system; but, however, laminating techniques are usually sheet uniting means requiring subjecting the composite structure to relatively high levels of heat or adhesives and pressure. When pressure is used in conjunction with heat or adhesives, a new and different material composition results at the interface that differs substantially from either of the materials that are being united. Subsequently, laminating techniques inherently provide material between the layers which react differently to electrolyte flow than either of the materials that are united. It is reasonably obvious that both the surface and volume resistivity of the composite material formed in this manner are not enhanced by such a condition. Also, such an approach is probably a very expensive process since large quantities of crosslinked PVA film structures, suitable for laminating processes, are unavailable commercially.

The use of PVA films as barrier separators in a separator system is well known. In general, PVA material has been used as a barrier material in alkaline battery cells because suitably lightly crosslinked films have high mechanical strength and high hydrophilic properties. Also, suitably lightly crosslinked films can be fabricated readily from aqueous solutions despite the fact that noncrosslinked PVA will readily dissolve in water. This characteristic of PVA film provides a desirable attribute useful in battery separator systems.

But, however, most prior art methods for moderately crosslinking PVA to the extent required to form suitable barrier material for battery separator systems has required casting, onto base material such as a glass sheet, a film of noncrosslinked PVA from an aqueous solution. Then the PVA film which had been treated previously with a reagent that inhibits dissolution of the film, is contacted either by an acid catalyst or by an ionizing radiation technique in such a manner as to effect moderate insitu crosslinking of the PVA sheet. This moderately crosslinked PVA sheet is removed from the glass sheet base and then laminated or spot bonded to an absorber-type material to form the composite separator/absorber separator.

Various techniques and methods to achieve lightly crosslinked PVA film structures have been employed to improve the mechanical properties and chemical stability of PVA film for use as barrier material in alkaline battery cells.

U.S. Pat. No. 4,154,912 which issued May 15, 1979, to Philipp et al describes a two step method for forming an insitu self crosslinked PVA separator.

U.S. Pat. No. 4,218,280 which issued Aug. 19, 1980 also of Philipp et al describes an irradiation technique for crosslinking a PVA film which also had been cast on a sheet of glass.

U.S. Pat. No. 3,951,687 dated Apr. 20, 1976 of Takamura et al describes a PVA separator formed by coating both sides of a porous alkaline resistant nonwoven substrate with a mixture of an aqueous PVA solution and at least either of one selected from boric acids and metal oxides having low solubility to alkali solution and then drying the nonwoven fabric thus coated. Such procedure taught by Takamura et al could be used to mass produce PVA separators for sandwich-type use but by coating both sides of the substrate with the mixture appears to increase the volume resistivity of the separator material.

Another method for forming a PVA separator is described in U.S. Pat. No. 4,037,033 dated July 19, 1977 also of Takamura et al. There, a nonwoven fabric is pretreated by soaking it in a solution of a surfactant and then drying it. Then a mixture of PVA and an aqueous boric compound is coated over the treated nonwoven fabric covering all surfaces so that the separator does not have any large channels capable of being penetrated by dendrite growth. Such a procedure also could be used to mass produce PVA separators but it would consume considerable amounts of time and the separator is probably most useful in the sandwich-type separator systems.

A search for various other means of providing a PVA separator system which would eliminate the need for a separate absorber sheet and which could be mass produced readily was initiated. This search was successful and resulted in the present invention.

SUMMARY OF THE INVENTION

The present invention is directed to a composite absorber/barrier battery separator for use in an alkaline battery cell to separate a negative electrode from a positive electrode when disposed in a suitable electrolyte. In addition to separating the electrodes, the present separator provides relatively low resistance to electrolyte ion transfer but substantial resistance to electrode ion transfer during cell operation. Transitions from hydrodynamic flow to diffusional flow is also effected with very little delay during both charging and discharging of the cell since the interface between the absorber and barrier is a structure with substantially nominal volume resistivity.

The separator includes a flexible and fibrous electrolyte absorber and a moderately crosslinked polyvinyl alcohol film mechanically adhered thereto. The absorber is a flexible substrate treated to be resistant to strong alkali and to oxidation. The absorber material is capable of absorbing electrolyte, holding electrolyte in contact with an electrode, acting as a low resistance passageway for electrolyte ion transfer and sustaining hydrodynamic flow of electrolyte solution. However, the absorber material by itself does not provide a sufficient barrier to electrode ion transfer.

In the preferred embodiment of the separator a barrier to electrode ion transfer is provided by coating the absorber with a suitable polyvinyl alcohol coating in a particular manner. This coating includes an admixture of a noncrosslinked polyvinyl alcohol solution, inert fillers, a dispersing agent, a plasticizer, a cross-linking agent, a low molecular weight alcohol-water mixture and an acid catalyst.

An initial coat of the admixture is applied to the absorber web by a reverse roll coating technique to form a base coating covering a top surface of the web so as to cause minimal penetration of the coating into the fibers of the web. Thereafter Mayer roll coating techniques are applied to get rid of flaws in the base coating and to provide a smooth overcoat to the coated web. The thus coated web is cured at a temperature sufficient to effect a moderate crosslinking of the polyvinyl alcohol (i.e., the curing of the PVA through the crosslinking agent only); the curing is accomplished without any degrading of the integrity of the web structure.

When the composite absorber/barrier separator is immersed in alkaline electrolyte, the moderately cross-linked film swells increasing the volume of the film structure yet retaining an impermeability to reactive ions.

During cell operation, the absorber sustains hydrodynamic flow while the polyvinyl alcohol film coating sustains diffusional flow. The transition from hydrodynamic flow to diffusional flow occurs without any substantial delay since the interface between the absorber and the barrier film is characterized by having no substantially new structure at the interface which would impede electrolyte flow and since the film is mechanically bonded to the fibers of the web.

DETAILED DESCRIPTION OF THE PREFERRED EMBODIMENT

Figure 1:
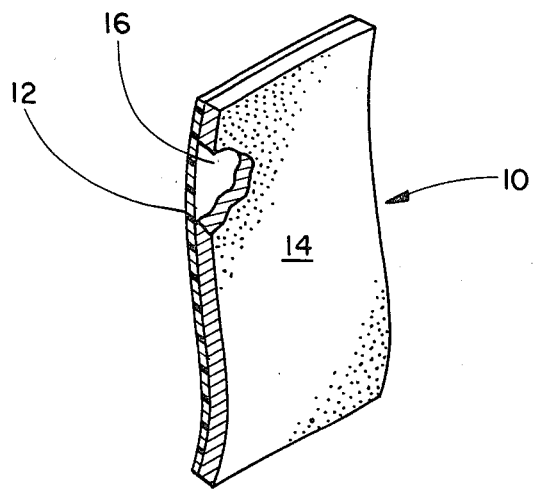
FIG. 1 illustrates a greatly enlarged perspective view of a sheet of the composite absorber/barrier separator material of this invention.

Referring to the drawing figures, FIG. 1 shows a greatly enlarged perspective view of a dual function separator system 10 in accordance with the present invention. Separator system 10 includes an electrolyte absorber 12, and a (PVA) film barrier 14 adhered to a top surface 16 of absorber 12.

In the preferred embodiment, electrolyte absorber material 12 is a substantially permanently wettable nonwoven polypropylene web, as described in pending application Serial No. 165,656 to Schmidt and Weber "Alkaline Battery, Electrolyte Absorber Therefor" filed July 3, 1980.

This absorber material, which remains substantially permanently wettable when immersed in electrolyte, has microscopic interstices between the fibers sufficiently large to make the fibrous material very permeable to the electrolyte. Although very permeable, this absorber material has high capillary retention as well as surface retention of the electrolyte yet strong resistance to decomposition in alkali.

The preferred embodiment PVA film barrier 14 which is formed by a novel coating process which links together, by an insitu process, a plurality of PVA film coats into a single homogeneous diffusion type barrier provides a low resistance passageway for electrolyte ions, but a barrier to electrode ions during hydrodynamic flow of ions and masses in electrochemical cells.

This above described separator 10 was found to have an area resistivity of 0.4 ohm-cm$^2$ and a zinc diffusion rate of $2.48 \times 10^{-7}$ moles per square cm per minute in 45% KOH electrolyte, the area resistivity being measured with respect to the resistivity of the PVA barrier 14.

It is appreciated by those skilled in the art that the electrical resistance of the separator material and the zinc diffusion rate are valuable indicators of the performance of the PVA film coat when it is employed as a barrier in working cells of a battery. This is so because the voltage loss in battery cells can be estimated from the separator material resistance values and battery cell cycle life can be similarly estimated from the rate of zinc diffusion through the separator.

In addition to the embodiment described above, other materials suitable for use as absorber material in this invention and commonly used in other prior art battery cell applications include flexible webs of potassium titanate fiber paper, aluminum silicate fiber paper, mixtures of synthetic wood pulp and asbestos fibers and the same fibers as components of woven and nonwoven fabrics. Where alkaline resistance isn't a critical factor, then cellulose paper may be used as a suitable absorber material in this invention. The absorber may have a thickness of from about 3 to 50 mils and a basis weight in the range of about 15 to 200 g/m$^2$.

Barrier 14, in a preferred embodiment, is comprised of 1000 grams of 10% (PVA) resin; 289.9, gms of 69% inert filler, the filler being hydrophilic but non-reactive and insoluble in alkaline electrolyte; 5.7 gms of 35% dispersing agent; 20 gms of 100% plasticizer; and 25 gms of 40% crosslinking agent. 74.6 gms of water is added to the admixture to form a dilution of 23.5% solids. Then 29.8 gms of a mixture of isopropyl alcohol and water is added to bring the dilution down to 23.0% solids and to control coating rheology. (the weights in grams are wet weights and the percentages are percent of solids). Just prior to the coating operation, an acid reagent such as dilute sulfuric acid is used to adjust the pH to approximately 4.0–5.0.

The preferred PVA is a 90,000 to 10,000 molecular weight of fully hydrolyze resin sold under the trade designation ELVANOL (71–30) by duPont de Nemours, E. I. & Co., Inc. of Wilmington, Del. The inert filler in this example is clay sold under the trade designation ULTRAWHITE 90 by Engelhard Minerals and Chemical Corporation of Edison, N.J. The particular dispersing agent used is sold under the tradename LODYNE S-103 Ciba Gigy of Ardsley, N.Y. The plasticizer is one sold under the trade designation CARBOWAX-350 by Union Carbide of New York, N.Y. The preferred crosslinking agent is glyoxal, a dialdehyde sold under the trade designation GLYOXAL 40 by American Cyanamide of Stamford, Conn.

Other PVA compositions of medium viscosity with high percentages of hydrolysis levels, for example between 98–100% would be suitable for use in this invention. Other suitable inert fillers, in addition to that named in the preferred embodiment, may be materials such as metallic oxides, titanates, silicates and the like, and may be powdered or fibrous particles of a suitable size.

The inert filler content may comprise from 0–400 dry parts based on 100 parts of PVA depending on the coating and drying techniques employed.

Other common classes of sulfonate which are nonreactive and nonoxidizable in the battery cells may be used as alternate dispersing agents. The amount of dispersing agent, in the admixture may be varied from 1 to 10 dry parts based on 100 parts of PVA depending on the coating and drying techniques employed.

Other water dispersible plasticizers from any of a series of commercially produced liquid and solid polymer glycols methoxylated and ethoxylated glycols may be suitable substitutes for the preferred plasticizer, Carbowax.

The amount of plasticizer in the admixture may be varied from 0–40 dry parts of 100 parts of PVA depending on the levels of plasticity of the coating desired.

Alternate crosslinking agents may include the following dialdehydes: (1) Aliphatic, furyl, and aryl. Also, oligo aldehydes as well as certain special monoaldehydes such as glyoxylic acid (OHC-COOH) and analogs, substituted benzaldehydes, acetaldehyde derivatives and acrolein may be alternate crosslinking agents. Under suitable conditions, boron compounds and metaloxides having low solubility may be used to perform crosslinking of the PVA. Suitable boron compounds may be boron oxides, boric acid, metaboric acid and the salts of each of them. Suitable metal oxides may be magnesium oxide, calcium oxide, titanium oxide, zirconium oxide, aluminum oxide and Beta-alumina. The amount of cross-linking agent in the admixture may vary from 1–20 dry parts per 100 parts of PVA.

In preparing the film coating, the inert fillers are first finely dispersed in water with the aid of a colloid mill. The PVA is prepared in the conventional manner as prescribed by the manufacturer and then the dissolved PVA is added gradually while the filler dispersion is stirred with a low shear mixer. Then the dispersing agent and plasticizer are added. After the thus-mixed composition has been thoroughly stirred, and prior to application of the film coating to the absorber web, the crosslinking agent is added to the mixture along with a suitable amount of the acid catalyst such as dilute sulfuric acid to adjust the pH to between the ranges of 4.0 and 5.0 to increase the rate of the crosslinking reaction. This composition has a viscosity of from 10,000 to 15,000 centipoise.

In applying the coating to the top surface 16 of absorber 14, a suitable conventional paper coating method may be used. Coating applicators such as reverse rolls, gravure rolls, Mayer rods, air knives and the like are suitable for this purpose. But, however, for mass production of reams of the dual function separator material of this invention, novel arrangements and manipulative coating strategies and techniques have been employed to permit utilization of the conventional coating applicators to produce the novel product.

Figure 3:
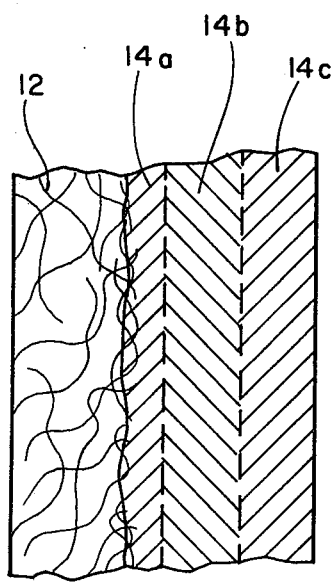
FIG. 3 is an exploded fragmentary sectional plan view illustrating the several coats applied to the absorber web.
Figure 2:
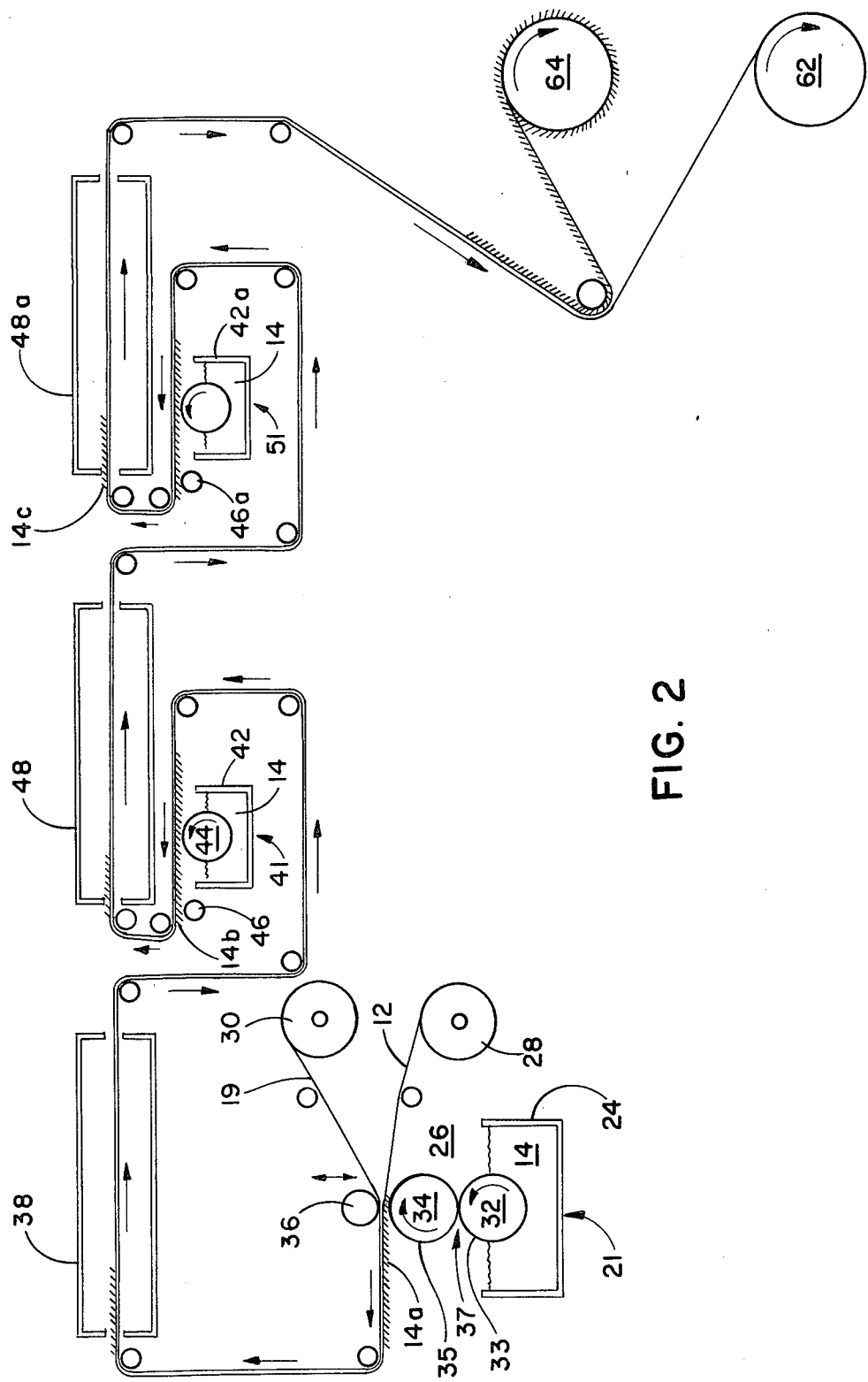
FIG. 2 is a block diagram representation of a preferred machine for coating the absorber web.

To describe the coating methods of this invention reference is made to FIGS. 2 through 3. Briefly, the coating method is performed in the following sequence. A first film coat is applied to a top surface 16 of FIG. 1 of the absorber 14 by a reverse roll coating process to achieve a base coating. From 4 to 8 gms/m$^2$ of the film composition is applied to surface 16. The second and third film coats are applied in succession upon the base coat by a pair of forward driven applicator rolls with subsequent metering accomplished by driven Mayer rods ("wire" wound doctoring rods). Both the second and third coats should comprise approximately 18 to 22 gm/m$^2$ of the coating composition.

To accomplish the above noted coating steps which provides absorber 12 with three (3) separate coats of PVA material, a preferred production-line coating system 20 utilized for practicing a portion of the coating and crosslinking processes of the present invention is depicted in FIG. 2.

Coating system 20 comprises three (3) coating application stations, namely a base coating station 21, a first Mayer rod coating station 41 and a second Mayer rod coating station 51.

The base coating station 21 includes a first coating container 24, a reverse roll coating mechanism 26 and a pair of storage reels 28 and 30. Storage reel 28 is used to store, illustratively, a 10 mil–0.5 mil caliper ream of absorber material 12; storage reel 30 is used to store illustratively a 1.5 mil–0.25 mil caliper ream of kraft paper material 19 used as a carrier web. Container 24, which is fixedly mounted to a support frame (not shown) is used to hold a sufficient amount of coating composition 14 for forming a base coat 14a on web 12 as illustrated in FIG. 3. The reverse roll coating mechanism 26 used to apply the base coat includes a metering roll 32, a first application roll 34, a press roll 36 and a first dry-air, chamber heater 38. The rolls 32, 34 and 36 are driven by motors (not shown) in the same angular direction (reverse surface direction) i.e., in the opposite direction to the travel of the web 12. The metering roll 32 is rotatably mounted within container 24 so as to permit an outer surface 33 of the roll 32 to contact the coating material contained therein and to transfer a predetermined amount of the material from the container to an outer surface 35 of applicator roll 34. Applicator roll 34, which is rotatably mounted and spatially disposed above metering roll 32 forms a metering nip 37 which enables a desired amount of coating material to be applied to the web 12. Press roll 36, a resilient, floating type roll is rotatably mounted and spatially disposed from applicator roll 34. Press roll 36 is used to assert a predetermined amount backup pressure against the web to effect the base coat 14a. Heater 38 is used to dry the base coat 14a and to remove substantially all of the water content of the coat without affecting the thermoplastic integrity of the absorber 12.

The first Mayer rod coating station 41 comprises a second coating container 42 a forward applicator roll 44 mounted within container 42 similar to the manner in which the metering roll 32 of the base coat station is mounted. Roll 44 applies a predetermined amount of the coating material 14 contained in container 42 to the base coat 14a. A mayer rod 46 disposed downstream from roll 44 is used to spread a metered amount of coating composition over the base coat 14a forming a second coat 14b utilized to eliminate flaws in coat 14a. Rod 46 applies a second coat 14b which is about 18 to 22 gm/m$^2$. Since the base coat and the succeeding coats are of the same material composition, a homogeneous coat is formed. This second coating disposed over the base coat is dried in a second heater 48 which is heated to a temperature compatible with the temperature applied to the base coat so as to dry the second coat without causing any detrimental effects to the thermoplastic properties of the absorber web 12.

The second Mayer rod coating station 51 is identical to the first Mayer rod coating station 41, hence no description of it is needed. Like components of station 51 are identified in FIG. 2 with like numerals of components of station 41 but contain a lower case letter of the alphabet to distinguish between the two stations. Station 51 is utilized to provide substantially perfectly flat third coat 14c overcoating the second coat 14b.

The operation of coating apparatus 20 will now be discussed. A carrier web 19 is initially threaded by hand from storage roll 30 through the base coating station 41, the first Mayer rod coating station, second Mayer rod coating station 51 to a take-up reel 62. Carrier web 19 is used to provide support to the absorber web 12 and to aid in minimizing thermo-expansion and shear stressing of the absorber material as the absorber web is transferred through system 20. Likewise, absorber web 12 is initially threaded by hand from reel 28 to a take-up reel 64. Both take-up reels which are motor driven (the drive system for the reels are not shown) are rotated at predetermined rates of speed, illustratively 100 ft/min, so as to permit coating and heating operations to occur at all three coating stations simultaneously and continuously.

Prior to activating the motor drive systems for the take-up reels, the nip between the reverse applicator roll 34 and the first metering roll 32 of the coating mechanism 26 is adjusted to approximately 2 mils. The pressure roll 36 which is a resilient or floating type roll is also adjusted to assert a predetermined amount of pressure on the material that is passed through the system. The Mayer rods 46 and 46a at stations 41 and 51 respectively are equipped with wire of a suitable diameter to effect the desired amount of metered spreading of the coating composition at the respective stations.

The temperature of each of the heaters 38, 48 and 48a are adjusted to provide air at a temperature of approximately 93° C. for drying the film coats.

The crosslinking and acid catalyst are admixed with the coating composition as previously described and suitable amounts of the composite coating composition are deposited in the three coating containers 24, 42 and 42a at each of the coating stations.

Immediately upon filling the containers the drive motors for the take-up reels 52 and 64 are activated initiating the three layer coating process at a rate preferably of 100 ft/min. but however, the coating rate can be varied from 90 to 200 ft./min. depending upon the amount of coating composition employed.

At station 21, the applicator roll 34 which rotates in an angular direction opposing the direction of travel of web 12, applies the first coat 14a, a reverse base coating, upon the top surface 16 of web 12 amounting to about 4 to 8 gm/m$^2$ of the coating composition. This technique is used to minimize the penetration of the coating into the web because it is desired in the course of coating the top surface 16 of web 12 to maintain web 12 as an absorber even within the interface between the web and the coating composition. The base coated web is passed through heater 38 where almost all of the water of content is removed from the coating; the heater not providing enough heat to affect thermoplastic properties of web 12.

At station 41, the forward applicator roll 44 which is angularly rotated in the same direction of travel as that of web 12 applies a second coat 14b to web 12 that overcoats the base coat 14a. The coat 14b which is a much heavier coat than coat 14a is utilized to eliminate flaws and coating "missouts" in coat 14a which may have occurred during this base coating application. Mayer rod 46, which is located downstream from roll 44 is used to control the final coat weight of from 18 to 22 gm/m$^2$.

The second coat 14b is dried in the heater 48 of coating station 41 in the same manner as the base coat 14a.

These coats are separately dried because it would be practically impossible to dry a single heavy coated web during a single drying operation without destroying the fibrous structure of absorber web 12 since very high temperatures, which would exceed a thermo-threshold of the plastic material would be required.

At station 51, a third coating 14c is applied. Coat 14c is applied in the same manner by identical equipment as was second coat 14b. Mayer rod 46a at station 51 is used to provide a substantially perfectly flat third coat overcoating the second coat 14b in amounts of approximately 18 to 22 gm/m$^2$.

Upon completion of the three layer coating process, the carrier web 19 is stored on a take-up reel 62 for future use, while the coated web 20 is stored on a take-up reel 64.

The coated web 10 is then taken to a curing oven (not shown) and cured at a temperature of approximately 110° C. for 6 to 12 hours or at 130° C. for 30 minutes to 2 hours. During the curing process the crosslinking agent, glyoxal is completely consumed. Bonding between polymer chains occurs, however, only to an extent whereat deterioration of the polymer materials is avoided. The extent of crosslinking that does occur ranges somewhere between where the glyoxal is completely consumed but significantly below where PVA directly crosslinks with PVA. Also during the curing process, the moderately crosslinked film forms a mechanical bond with the fibers of the absorber web.

To determine whether the proper amount of curing is performed to moderately rather than completely, crosslink the PVA, a sample of the separator material 10 is obtained from a pilot run roll of material. The sample is placed in boiling water at a temperature of at least 90° C. for 30 minutes. Then the sample is removed and measurements are made by conventional means to determine the amount of PVA that was lost or was not crosslinked. If less than 5% of the film is lost, then the level of curing is considered adequate because the solubility of PVA in 30% or higher KOH is much smaller than boiling water. The resulting product comprises a composite absorber/barrier material having a single homogeneous film coat 14 which is mechanically bonded to the top surface 16 of the absorber web 12 in a manner such that no substantial new material structure is formed within the vicinity of the interface between the absorber web and film coat. Such a material permits hydrodynamic flow of electrolyte to occur in the absorber 12 and diffusional migration within the film coating 14. There is essentially no loss of resistivity within the vicinity of the interface between the absorber and film coat of the kind which would occur if thermal spot bonding or laminating processes were employed. The composite structure of the preferred embodiment is approximately 11.5 mils thick with the absorber being about 10 mils thick and the film about 1.5 mils thick. Suitable separator material of this invention can be formed from absorber material of thickness ranging from 3 to 50 mils and film ranging from 0.5 to 3 mils.

The preferred embodiment of the composite absorber/barrier battery separator system 10 should have the following properties: (1) sufficient physical strength to provide strong mechanical spacing between electrodes in the cell; (2) minimum resistance to electrolyte ion flow (the absorber portion being responsive to hydrodynamic flow; the barrier portion being responsive to diffusion) (3) sufficient flexibility to be formed into electrode housing units without cracking; (4) good electrical insulation properties; (5) reasonably strong chemical resistance to degradation by electrolyte or other active materials; (6) an effectiveness in preventing migration of electrode ions and particles between electrodes of opposite polarity; (7) ability to be fabricated in thin uniform sheets without creasing, curling, misalignment folds, discontinuities between the two contiguous materials forming the composite structure; (8) dimensional stability over the entire range of thermodynamic and electrochemical conditions encountered during cell operation and (9) ability to retain sufficient electrolyte to carry out cell operations even with limited electrolyte or at high gravitation conditions or in upturned positions.

During cell operation, the absorber 12 of the composite separator system 10 exhibits the ability to retain sufficient electrolyte within the separator system to enable cell operations even during the occurrence of hydrodynamic flow or even when the cell contains limited amounts of electrolyte at high gravitational conditions or in upturned positions. The barrier coat 14 absorbs the electrolyte and tends to swell to provide electrolyte transfer while resisting electrode ion transfer.

When employed in primary and secondary batteries of the type which may include electrode "couples" of mercuric oxide-zinc, manganese dioxide-zinc, nickel-zinc and nickel-iron materials, a separator sheet of absorber material and a separate sheet of barrier material are commonly shaped to form a housing for enclosing one of the electrodes. Often times an absorber is also used to house the other electrode.

The problems associated with alignment, curling, creases, misalignment and folds which often occur during the manufacture of battery cells requiring housing constructed in the aforenoted manner, are virtually eliminated when the composite absorber/barrier separator of the present invention is used.

Figure 4:
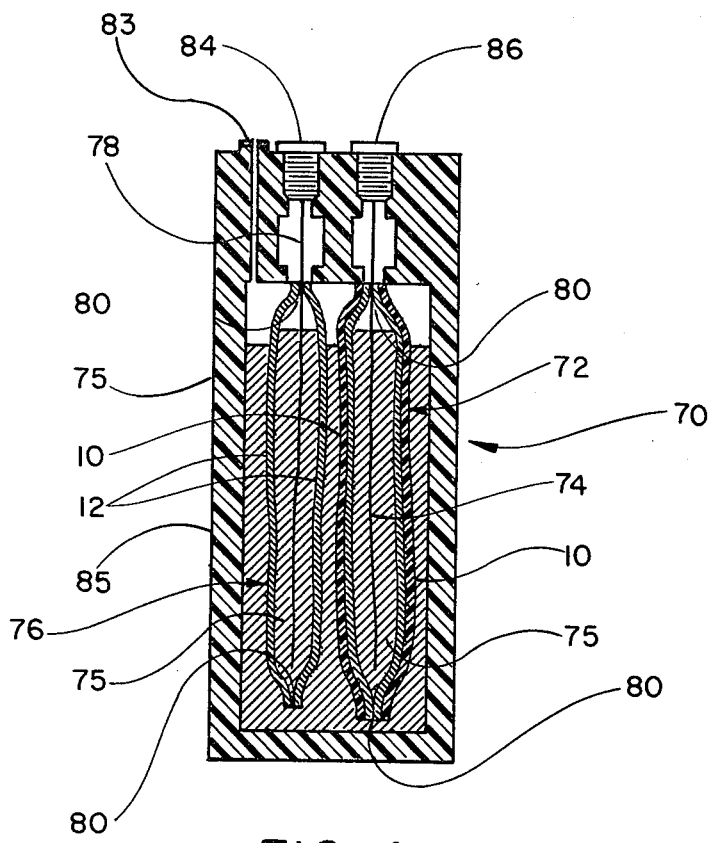
FIG. 4 is a cross-sectional view of an alkaline battery cell employing an absorber for housing a first electrode and the composite absorber/barrier separator of the present invention for housing a second electrode.

With reference to FIG. 4, there is illustrated in exaggerated size for illustrative purposes a cross section of Ni-zn alkaline battery cell 70 comprising a glass container 85 with an absorber/barrier separator housing 72 disposed about a zinc electrode 74 and an absorber housing 76 disposed about a nickel electrode 78. The absorber/separator housing 84 comprises a single sheet of separator material 10 of FIG. 1 folded to form a pouch and heat sealed along the edges 80. Absorber housing 76, similarly constructed, comprises a single sheet of absorber material 12 of FIG. 1. The electrode and the housings are partially immersed in a solution of electrolyte 75, preferably at 35-45% solution of potassium hydroxide (KOH). A port 83 is provided to permit venting excess gas which might develop during charging and to provide an excess port for adding electrolyte. In cell 70, the electrodes 74 and 78 are suitably electrically connected to negative and positive terminals 84 and 86 respectively to form opposite polarity cell output terminals. The composite separator system 72 is disposed about the zinc electrode 86 to hold in zincate ions while holding electrolyte near the electrode; zincate ions have some difficulty in diffusing through the PVA coating barier portion 14 of the separator system 72 due to the highly torturous interstices and micropores formed by the crosslinking that transcends the film coating that is mechanically bonded to absorber 12.

It is to be understood that the above-described embodiments are mainly illustrative of the principles of the invention. One skilled in the art may make changes and modifications to the embodiments disclosed herein and may devise other embodiments without departing from the scope and the essential characteristics thereof.

What is claimed is:

1. An improved composite absorber/barrier battery separator for use in an alkaline battery cell for physically separating electrodes of said cell and for controlling the transfer of ions in an electrolyte solution during cell operation, in which said composite separator includes an absorber comprised of a flexible and fibrous substrate, resistant to strong alkali and oxidation while holding electrolyte in contact with said electrodes during electrolyte ion transfer, said improvement comprising:

a moderately cured polyvinyl alcohol film adhered to at least one side of said absorber prepared from an aqueous coating composition comprising of:
(a) a polyvinyl alcohol aqueous dispersion comprised of (1) a noncrosslinked polyvinyl alcohol solution, (2) inert hydrophilic fillers (3) a dispersing agent, (4) a water soluble plasticizer, and (5) a low molecular weight alcohol-water mixture; and
(b) a crosslinking agent admixture comprised of; (1) a crosslinking agent, and (2) a catalyst;

said dispersion and said admixture being characterized by having an insitu crosslinking property for forming a matrix of polyvinyl alcohol molecules which is insoluble in alkaline electrolyte, said crosslinking property being activated when said coating composition is cured at a desired temperature to moderately crosslink the polyvinyl alcohol with the crosslinking agent, said matrix of polyvinyl alcohol molecules being a semi-permeable film which mechanical bonds to said web along a interface of said film and said absorber web, said interface being a region formed of a portion of said film physically entangled with a portion of said web, having a thickness which is sufficiently small with respect to the thickness of said film, so as to substantially preclude delays in transitions from hydrodynamic flow through the absorber to diffusional flow through said film of electrolyte ions and masses during cell operations.

2. A separator in accordance with claim 1, wherein said noncrosslinked polyvinyl alcohol is a medium viscosity polymer within the group of polyvinyl alcohol polymers with high percentages of hydrolysis levels of between 98 and 100%.

3. A separator in accordance with claim 1, wherein said inert fillers are powdered or fibrous and are selected from the group consisting of kaolin clays, metallic oxides, titanates and silicate of a suitable size and wherein said fillers are substantially insoluble in alkaline electrolyte.

4. A separator in accordance with claim 1 wherein said dispersing agent is a salt or ester of a sulfonic acid which is nonreactive and nonoxidizable in alkaline electrolyte.

5. A separator in accordance with claim 1, wherein said water soluble plasticizer is selected from the solid and liquid polymer glycol groups consisting of methoxylated and ethoxylated glycols.

6. A separator in accordance with claim 1, wherein said crosslinking agent is selected from dialdehyde, boron compound and metal oxide groups consisting of aliphatic, furyl and aryl dialdehydes, oligo aldehydes, glyoxylic acid (OHC—COOOH) and analogs, substituted benzaldehydes, and acetaldehyde derivitives acrolein.

7. A separator in accordance with claim 1, wherein the alcohol in the alcohol-water mixture is isopropyl alcohol useful for controlling coating rheology.

8. A separator in accordance with claim 1, wherein said catalyst is diluted sulfuric acid.

9. A separator in accordance with claim 8, wherein said polyvinyl alcohol coating composition is comprised of from 0 to 400 dry parts of said inert filler, from 1 to 10 dry parts of said dispersing agent, from 0–40 dry parts of said plasticizer, from 1–20 dry parts of said crosslinking agent; and wherein each of said dry parts being based on 100 parts of polyvinyl alcohol.

10. A separator in accordance with claim 9, wherein the pH of said polyvinyl alcohol coating composition is adjusted to a range between 4 and 5 to increase the rate of the crosslinking reaction.

11. A separator in accordance with claim 10, wherein said film has a basis weight ranging from 20 gm/m$^2$ to 150 gm/m$^2$.

12. A separator in accordance with claim 11, wherein the area resistivity is from 0.2 to 0.6 ohm-cm$^2$.

13. A separator in accordance with claim 1 wherein the caliper of said absorber web is 10.0 to ±0.5 mils.

14. A separator in accordance with claim 1, wherein said crosslinking agent admixture is a crosslinking agent selected from boron oxides, boric and metaboric acids and the salts of each of them, magnesium oxide, calcium oxide, titanium oxide, zirconium oxide, aluminum oxide and Beta-alumina.

* * * * *